United States Patent
Jordan et al.

(10) Patent No.: US 7,454,666 B1
(45) Date of Patent: Nov. 18, 2008

(54) REAL-TIME ADDRESS TRACE GENERATION

(75) Inventors: Paul J. Jordan, Austin, TX (US);
Joseph T. Rahmeh, Austin, TX (US);
Gregory F. Grohoski, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 562 days.

(21) Appl. No.: 11/102,203

(22) Filed: Apr. 7, 2005

(51) Int. Cl.
*G06F 11/00* (2006.01)
(52) U.S. Cl. .......................... 714/45; 714/47; 717/128; 712/227
(58) Field of Classification Search .................. 714/45, 714/47, 25, 46; 712/227; 717/127, 128
See application file for complete search history.

(56) References Cited

U.S. PATENT DOCUMENTS

| | | | | |
|---|---|---|---|---|
| 6,145,123 A * | 11/2000 | Torrey et al. | ................ | 717/128 |
| 6,202,199 B1 * | 3/2001 | Wygodny et al. | ........... | 717/125 |
| 6,243,836 B1 * | 6/2001 | Whalen | ........................ | 714/45 |
| 6,253,338 B1 * | 6/2001 | Smolders | .................... | 714/45 |
| 6,282,701 B1 * | 8/2001 | Wygodny et al. | ........... | 717/125 |
| 6,314,529 B1 * | 11/2001 | Rana | ............................ | 714/29 |
| 6,314,530 B1 * | 11/2001 | Mann | ........................... | 714/38 |
| 6,467,083 B1 * | 10/2002 | Yamashita | .................. | 717/128 |
| 6,539,500 B1 * | 3/2003 | Kahle et al. | .................... | 714/45 |
| 6,604,210 B1 * | 8/2003 | Alexander et al. | ............ | 714/39 |
| 6,615,370 B1 * | 9/2003 | Edwards et al. | ............... | 714/45 |
| 6,615,371 B2 * | 9/2003 | McCullough et al. | ......... | 714/45 |
| 6,684,348 B1 * | 1/2004 | Edwards et al. | ............... | 714/45 |
| 6,732,307 B1 * | 5/2004 | Edwards | ..................... | 714/724 |
| 6,742,063 B1 * | 5/2004 | Hellum et al. | ................. | 710/66 |
| 6,859,891 B2 * | 2/2005 | Edwards et al. | ............... | 714/30 |
| 6,877,114 B2 * | 4/2005 | Allen et al. | .................... | 714/45 |
| 6,996,747 B2 * | 2/2006 | Swoboda et al. | ............... | 714/30 |
| 7,051,131 B1 * | 5/2006 | Wiedenman et al. | ........ | 710/107 |
| 7,058,859 B2 * | 6/2006 | McCullough et al. | ......... | 714/45 |
| 7,058,928 B2 * | 6/2006 | Wygodny et al. | ........... | 717/128 |
| 7,062,684 B2 * | 6/2006 | DeWitt et al. | .................. | 714/45 |
| 7,069,479 B2 * | 6/2006 | Hester et al. | ................... | 714/45 |
| 7,093,108 B2 * | 8/2006 | Swaine | ........................ | 712/227 |
| 7,133,821 B2 * | 11/2006 | Agarwala et al. | ............. | 703/23 |
| 7,134,116 B1 * | 11/2006 | Thekkath et al. | ............ | 717/128 |
| 7,162,411 B2 * | 1/2007 | Agarwala et al. | ............. | 703/28 |
| 7,185,234 B1 * | 2/2007 | Thekkath | ...................... | 714/45 |
| 7,197,586 B2 * | 3/2007 | DeWitt et al. | ................ | 710/260 |
| 7,197,671 B2 * | 3/2007 | Swaine et al. | .................. | 714/45 |
| 7,200,776 B2 * | 4/2007 | Harris | ........................ | 714/45 |
| 7,278,063 B2 * | 10/2007 | Billeci et al. | ................... | 714/45 |
| 2002/0178405 A1 * | 11/2002 | McCullough et al. | ......... | 714/45 |
| 2003/0061550 A1 * | 3/2003 | Ng et al. | ....................... | 714/45 |
| 2003/0120980 A1 * | 6/2003 | Harris | ......................... | 714/45 |

\* cited by examiner

*Primary Examiner*—Scott T. Baderman
*Assistant Examiner*—Bradford A Rodgers-Farme
(74) *Attorney, Agent, or Firm*—Martine Penilla & Gencarella LLP

(57) ABSTRACT

A method for tracing of instructions executed by a processor is provided which includes providing a type of instruction to be traced and tracing at least one instruction corresponding to the type of instruction. The method further includes storing data without stopping from the tracing into a memory until the memory is full.

20 Claims, 5 Drawing Sheets

REAL-TIME ADDRESS TRACE GENERATION

BACKGROUND

1. Field of the Invention

The present invention relates to determining hardware performance, and more specifically to address trace generation.

2. Description of the Related Art

Traditionally, benchmarks of computer hardware is conducted to determine hardware performance. Generally, hardware traces are produced through a technique called sampling. The hardware runs the benchmark for some specified number of instructions or period of time. After this period, the hardware takes a trap. Software then queries and records hardware state. Software then resumes the benchmark at the point of the trap and allows the benchmark to run for another period. This period is followed by another trap and recording of state. This pattern continues for some predetermined number of traps or periods. The primary disadvantage to a software sampling method is that the execution of the benchmark itself is stopped during the sampling, which perturbs its behavior and distorts the resulting trace. In addition, sampling (whether through software or hardware) only gives single points of information. No information is recorded about what occurred between the samples.

Accordingly, what is needed is an apparatus and a method for providing instruction and data traces without perturbing the system being traced.

SUMMARY

Broadly speaking, the present invention is an apparatus and a method for intelligently providing complete instruction and data traces from hardware. It should be appreciated that the present invention can be implemented in numerous ways, such as a process, an apparatus, a system, a device or a method on a computer readable medium. Several inventive embodiments of the present invention are described below.

A method for tracing of instructions executed by a processor is provided which includes providing a type of processor instruction to be traced and tracing at least one instruction corresponding to the type of instruction. The method further includes storing data from the tracing without stopping instruction execution into a memory until the memory is full.

In another embodiment, a method for tracing of instructions executed by a processor is provided which includes storing a type of instruction to be traced into a trace configuration register in the processor and tracing at least one instruction corresponding to the type of instruction stored in the trace configuration register. The method further includes storing data from the tracing into a memory until the memory is full where the storing includes decrementing a counter for each address stored in the memory and stopping the tracing when the counter is zero.

In yet another embodiment, a processor is provided which includes a memory management unit having at least one trace register. The memory management unit is configured to trace an instruction corresponding to a type of instruction stored in the at least one trace register. The processor also includes a memory configured to include a trace buffer where the trace buffer is capable of storing an address obtained from the trace. The memory management unit is configured to stop the storing when the trace buffer is full.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION

Figure 1:
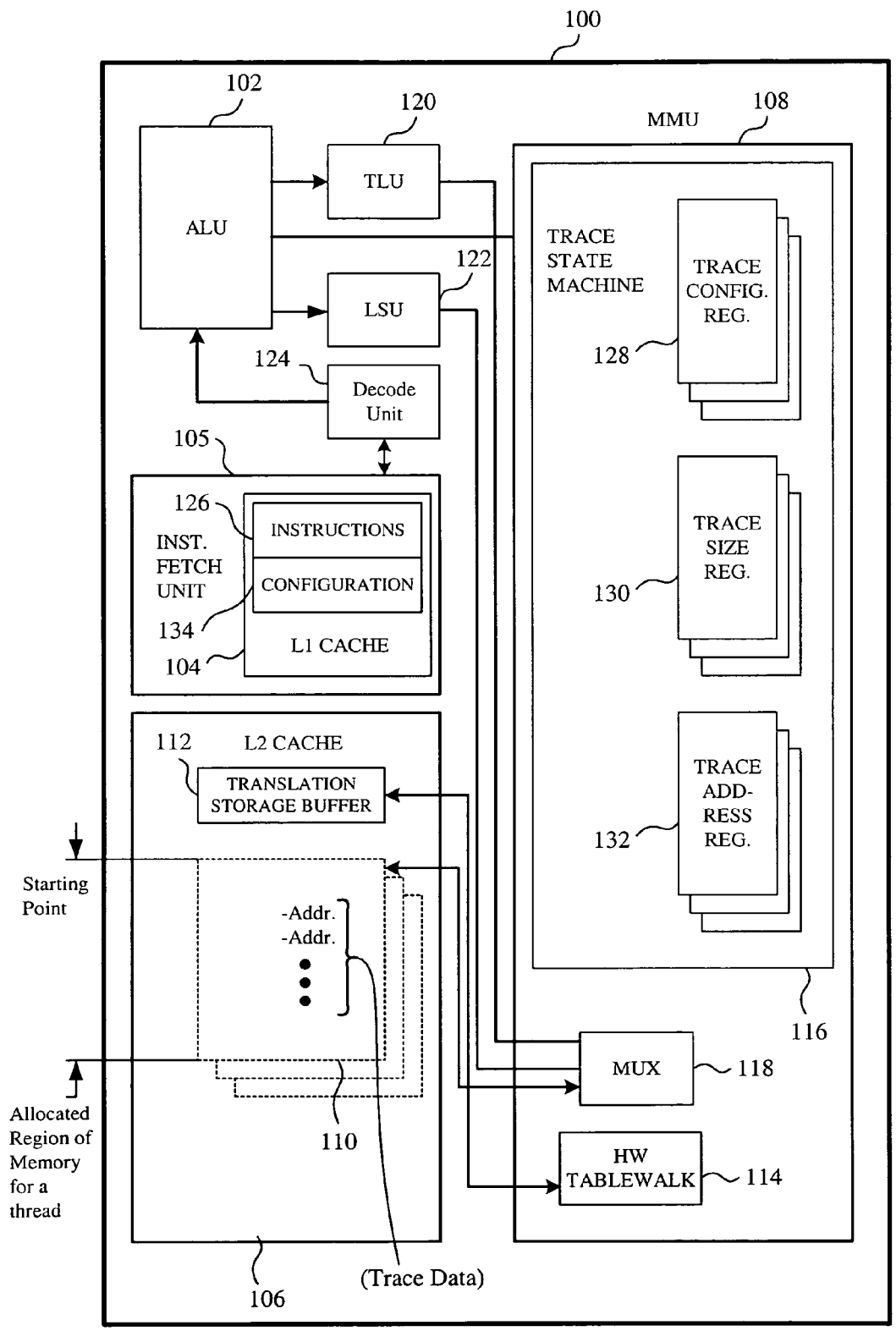
FIG. 1 illustrates a processor in accordance with one embodiment of the present invention.

The following embodiments describe an apparatus and method for intelligently providing complete instruction and data traces from hardware. It will be obvious, however, to one skilled in the art, that the present invention may be practiced without some or all of these specific details. In other instances, well known process operations have not been described in detail in order not to unnecessarily obscure the present invention.

Processor and system designers attempt to estimate the performance of their designs before manufacture. This performance modeling allows the designer to explore different design options, comparing the relative performance of the options without fully designing the processor or system. Typically, traces of actual benchmark code running on real systems are applied through these performance models in the process of estimating the performance of the design on the benchmark. The estimates of the performance of the design are highly dependent on the accuracy of the modeling and on the accuracy of the trace.

The benchmark trace is a collection of information about the benchmark as it is executed on the hardware. A trace may consist of the addresses of the executed instructions. Given the addresses of executed instructions and copy of the executable of the benchmark, a more detailed trace that includes the instructions themselves can be constructed. Additionally, if the hardware trace includes the addresses for loads and store accesses, memory accesses can also be included in the trace. These memory accesses allow the performance model to more accurately predict the behavior of the memory subsystem, which is increasingly a performance bottleneck and important to overall performance.

In a multithreaded processor it is possible to exploit the hardware parallelism and tracking that exists for functional correctness to create a relatively inexpensive and simple way to provide complete instruction and data address traces from hardware. In a multithreaded processor, the program counter (PC) of each instruction may be tracked through the pipeline so that traps can be precise. In addition, the addresses for loads and stores may also be tracked so that data translation misses and other load and store related faults can be handled via traps. A multithreaded processor can configure hardware normally used to support faults and the related traps to also support full address traces for a benchmark (on a single thread) running at full speed with no sampling traps. The memory subsystem for a multithreaded processor is designed to support the multiple threads accessing memory simultaneously in parallel with a minimum of interference between the threads. This invention takes advantage of this aspect of the memory subsystem. Software of the present invention as described herein can configure available threads to trace at full speed with no sampling traps and no or little distortion caused by the address tracing. This mechanism may allow the user to select the number of benchmarks running in parallel. The user can enable fewer benchmarks in parallel to minimize distortion, or can enable more benchmarks in parallel to increase utilization of the hardware.

As explained more fully below, the present invention can exploit the availability of the instruction and data addresses for each instruction in a memory management unit (MMU). The MMU can have a pathway to the Level 2 cache so that hardware may reload address translations without software intervention.

FIG. 1 illustrates a processor 100 in accordance with one embodiment of the present invention. It should be appreciated that the processor 100 may be any suitable processor such as, for example, a central processing unit (CPU). It should also be understood that the processor 100 described herein is exemplary in nature and any suitable architecture for the processor 100 may be utilized that can use the methodology described herein.

In one embodiment, the processor 100 includes an arithmetic logic unit (ALU) 102 connected to a trap logic unit (TLU) 120, a memory management unit (MMU) 108, a load/store unit (LSU) 122, and a decode unit 124. The TLU 120 and the LSU 122 are both also connected to a multiplexer 118 within the MMU 108. In one embodiment, the MMU 108 is located inside the core of the processor 100. As discussed below, the MMU 108 may use data in trace registers to trace certain types of instructions. The decode unit 124 is also connected to an instruction fetch unit 105 that contains an L1 cache 104.

The instruction fetch unit 105 can fetch instructions 126 and forward the instructions 126 to decode unit 124. After each of instructions 126 has been decoded by the decode unit 124, each of instructions 126 is forwarded to the ALU 102 for further processing. The ALU 102 forwards each of instructions 126 and associated status and data to the TLU 120 and the LSU 122. The TLU 120 forwards the instruction address for each of instructions 126 to the MMU 108 and the multiplexer 118. The LSU 122 forwards the load or store address of each load or store of instructions 126 to the MMU 108 and the multiplexer 118. The multiplexer 118 can select between the addresses provided by TLU 120 and LSU 122.

In one embodiment, the MMU 108 may include a hardware tablewalk 114, trace configuration register 128, trace size register 130, and trace address register 132. It should be appreciated that each particular thread has its own copy of each of the aforementioned registers 128, 130, and 132. The registers 128, 130, and 132 may be located within the trace state machine 116 which is within the MMU 108 which is in turn is within the processor. In one embodiment, data within the trace configuration register 128, the trace size register 130, and the trace address register 132 can be received from the execution of a software configuration 134. The software configuration 134 may use data defined by a user to configure the tracing to desired specifications. In one embodiment, software may configure tracing by allocating a region of memory for each thread to be traced. It may then program the starting address of this region which in one embodiment, is a trace buffer 110, into the trace address register and the size of the region into the trace size register. Software may then program the trace configuration register to indicate what instructions to trace.

As instructions are executed, the MMU 108 may multiplex the data and instruction addresses based on the trace configuration register and whether the instruction was a load/store or not. As the instructions complete, the MMU 108 stores the data or instruction address to any suitable memory location such as, for example, an L2 (level 2) cache 106 at the location indicated by the trace address register. It should be appreciated that the MMU 108 may store the data or instruction address to any suitable type of memory such as, for example, the L1 cache 104, the L2 cache 106, and/or main memory of a computer system. The MMU 108 then increments the trace address register 312 and the decrements the trace size register 128. When the trace size register 128 transitions to zero, the MMU 108 signals a trace_buffer_full exception, which causes the TLU 120 to take a trap soon thereafter. While the trace count register is zero, the MMU 108 does not store any additional addresses. The trap handler processes the stored trace or reprograms the trace address register 130 and trace size registers 132 to permit more tracing.

Therefore, depending on the data defined by the software configuration (not shown), the trace configuration register 128 can be configured to indicate what instructions to trace. In one embodiment, the types of instructions that may be traced include: specific opcodes, specific instruction types (e.g., taken branches), instructions executed by specific units (e.g., floating-point or load/store), user-mode instructions, supervisor-mode instructions, hypervisor-mode instructions. The trace configuration register may also support sampling tracing based on either numbers of instructions or numbers of cycles between samples.

The software configuration (not shown) may further configure the trace address register 132 to include the address in a memory space (e.g., trace buffer 110) to store the information regarding the instruction address for the instruction that has been traced. In one embodiment, the trace buffer 110 is a set of 64 bit records. An exemplary manner in which the trace buffer 110 may be configured is shown in table 1.

TABLE 1

| | Field: | | | |
|---|---|---|---|---|
| | Reserved | ThreadID | AddressType | Address |
| Bit Pos: | 63-52 | 51-49 | 48 | 47-0 |

In such an embodiment as shown in Table 1, bits 47-0 include the address, bits 48 include the address type (e.g., instruction address or data address), bits 51-49 include the identification of the thread where the tracing is taking place and bits 63-52 are not utilized in the particular implementation. It should be appreciated that the above embodiment is exemplary in nature and the trace buffer 110 may be configured in any suitable manner where data associated with the tracing may be stored. In another embodiment, other implementations may use larger (e.g., 128 bit) records to facilitate larger addresses and/or other ancillary information.

The software configuration (not shown) may also configure the trace size register 130 with data showing the size of the trace buffer 110. Therefore, the tracing to be accomplished by the method described herein can be altered and customized by appropriately managing the data incorporated in the software configuration (not shown). Consequently, the MMU 108, in one embodiment, may store the trace register data (e.g., data that defines the type and/or operation of the trace) in the trace address register 132, the trace size register 130, and the trace configuration register 128.

Furthermore, for functional reasons, the MMU 108 may be configured to keep track of the instruction address and any data access address for loads and stores during an instruction trace because the MMU 108 is responsible in the event an address translation does not exist for these addresses. If the MMU 108 does not have the translation, the MMU 108 may utilize the hardware tablewalk 114 which queries a buffer of translations (e.g., translation storage buffers 112) that are stored in the memory and cached in the L2 cache 106. The hardware tablewalk 114 is one example of how the MMU 108 communicates with the L2 cache 106 which in one embodiment may be located on-chip. In one embodiment, the hardware tablewalk 114 fetches translation table entries.

The MMU 108 may use the contents of the trace address register 132, trace size register 130, and trace configuration register 128 to analyze the instructions as they are executed, to multiplex between the instruction and data addresses, and to store, in one embodiment, either the instruction or data addresses that is desired to be traced. For each instruction that meets the criteria, the address of the instructions may be stored to a trace buffer 110 in any suitable memory such as, for example, the L2 cache 106. The trace size register 130 keeps track of how many addresses have been stored so that when the buffer is filled the trap can occur which then stops the program and moves control of the processor to a higher level of software which can empty the buffer and then restart the program at the point which it was stopped. In one embodiment, the software can configure the size the buffer and what instructions to monitor. Therefore, the amount of code that can be run with tracing may depend on the size of the buffer and the type of instructions monitored. Therefore, depending on the type of instructions to be traced, the system may be configured to run the entire code without any stoppage in the execution of the code. It should be appreciated that as the buffer in the memory such as, for example, the L2 cache is made bigger, the program may run slower because the program may have to do more fetches to the main memory. The methodology of the invention may be utilized by a user to adjust the size of the buffer and the type of instructions to be traced to suit the type of tracing desired.

Figure 2:
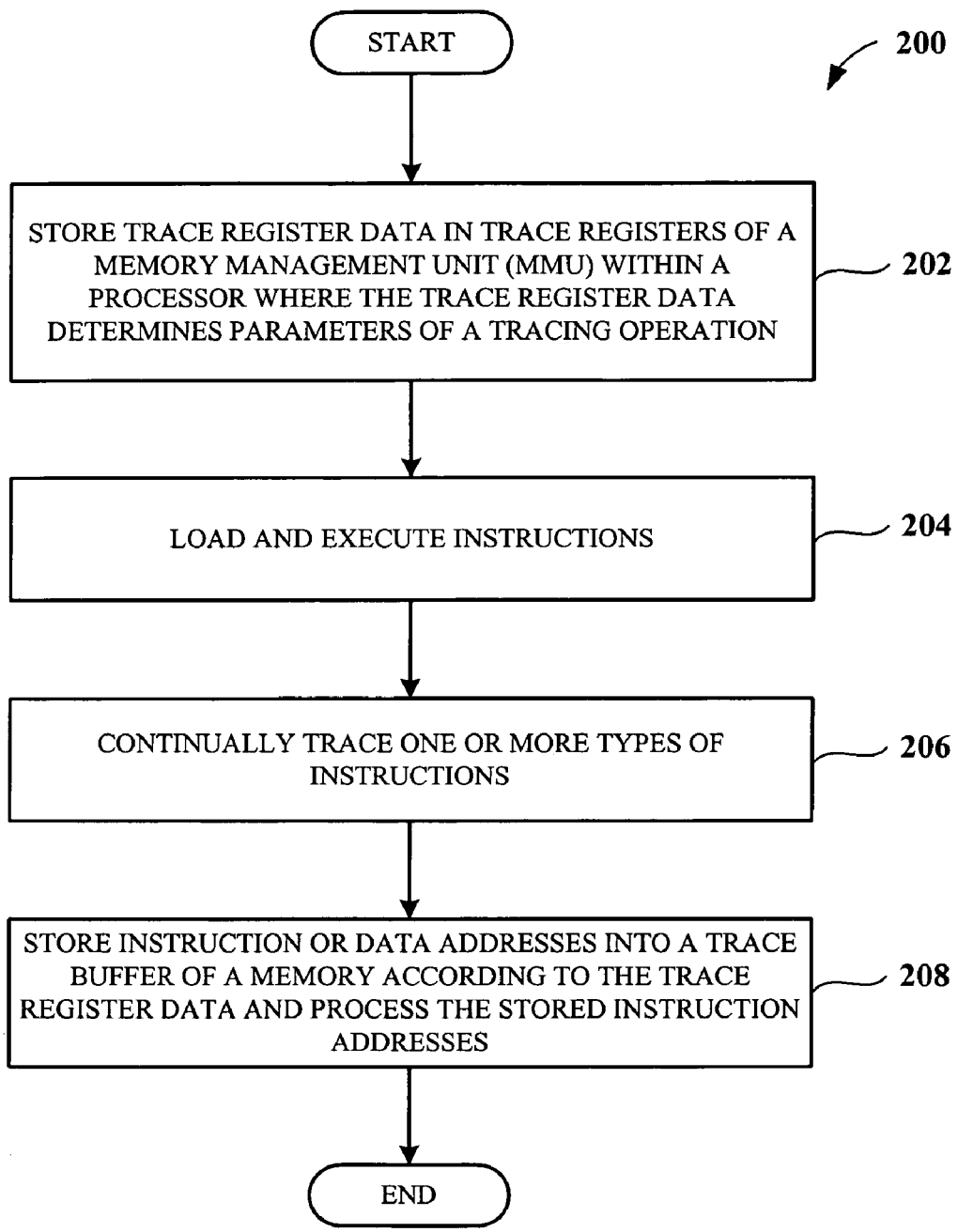
FIG. 2 illustrates a flowchart defining a method to trace instructions in accordance with one embodiment of the present invention.

FIG. 2 illustrates a flowchart 200 defining a method to trace instructions in accordance with one embodiment of the present invention. For completeness, the process flow of FIG. 2 will illustrate an exemplary process whereby a specified instruction to be run by a processor may be traced.

The flowchart 200 begins with operation 202 which stores trace register data in trace registers of a memory management unit (MMU) within a processor where the trace register data determines parameters of a tracing operation. Depending on the aspects of instructions tracing desired to be managed, different types of trace registers may be utilized. In one embodiment, a trace configuration register may be provided which can include data specifying certain types of instructions to be traced. One or a combination of the trace configuration register, a trace size register, and a trace address register may also be utilized as the trace registers. The trace configuration register, the trace size register, and the trace address register are described in further detail in reference to FIG. 1. A more detailed description of an exemplary embodiment of operation 202 is discussed in further detail in reference to FIG. 3.

After operation 202, the method proceeds to operation 204 which loads and executes instructions. The load and execution of instructions may take place in the processor 100 as described in further detail in reference to FIG. 1. Operation 204 is also described in further detail in reference to FIG. 4. Then the method moves to operation 206 which continually traces one or more types of instructions. In one embodiment, by designating one or more types of instruction in a trace configuration register, a user can determine which types of instructions are traced. In one embodiment, the operation 206 may compare the type of each instruction being executed with the types of instructions that are designated to be traced. When the type of instruction being executed matches one of the types being traced, the instruction or data address of the instruction is passed to operation 208. In one embodiment, instructions are continually traced until the trace buffer is full as described further in reference to operation 208 below. Therefore, the method may continually trace and store the types of instructions as determined by the types of instructions described in the trace configuration register as long as the trace buffer has available space.

As operation 206 provides addresses, the method advances to operation 208 which stores instruction or data addresses into a trace buffer of a memory according to the trace register data and process the stored instruction addresses. In one embodiment, instruction addresses from the trace is stored into a location within an L2 cache specified by one of the trace registers. It should be appreciated that the instruction addresses from the trace may be stored in any suitable memory in addition to or instead of the L2 cache such as, for example, an L1 cache, main memory, etc. In one embodiment, the trace address register may include the starting address of the trace buffer where the traced instruction addresses may be stored. When the trace buffer is full as indicated, for example, by a trace size register being at 0, the tracing of the instructions is halted. A further description of an exemplary embodiment of operation 208 is described in further detail in reference to FIG. 5.

Figure 3:
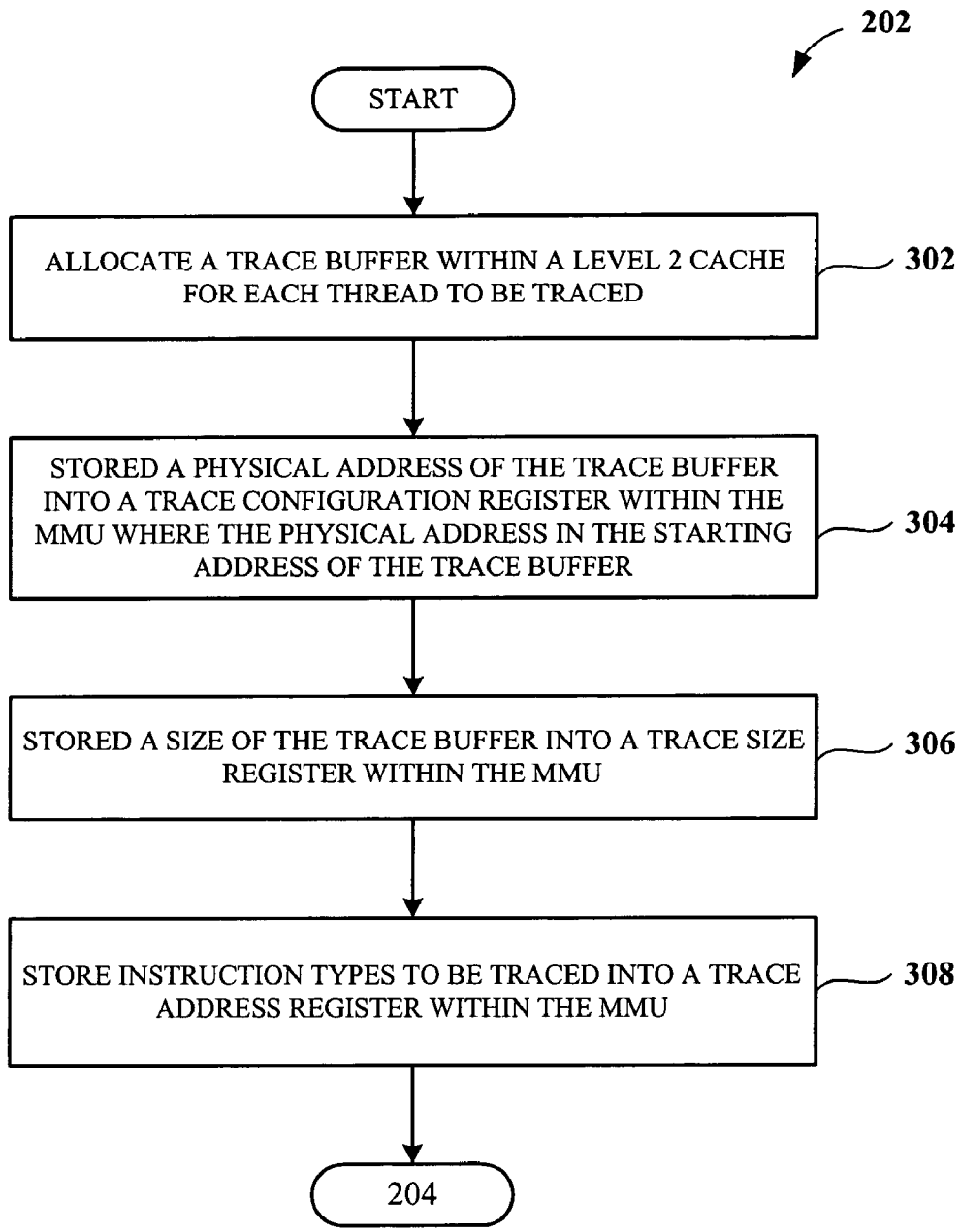
FIG. 3 illustrates a flowchart which defines the storing of trace register data in registers of an MMU within a processor where the trace register data determines the parameters of a tracing operation in accordance with one embodiment of the present invention.

FIG. 3 illustrates a flowchart 202 which defines the storing of trace register data in registers of an MMU within a processor where the trace register data determines parameters of a tracing operation in accordance with one embodiment of the present invention. In one embodiment, the flowchart 202 begins with operation 302 which allocates a trace buffer within a level 2 (L2) cache for each thread to be traced. It should be appreciated that the trace buffer may be located in any suitable memory location such as, for example, L1 cache, main memory, L2 cache, etc. After operation 302, the flowchart 202 moves to operation 304 which stores a physical address of the trace buffer into a trace configuration register within the MMU where the physical address is the starting address of the trace buffer. Then the flowchart 202 advances to operation 306 which stores a size of the trace buffer into a trace size register within the MMU. After operation 306, the flowchart 202 proceeds to operation 308 which stores instruction types to be traced into a trace address register within the MMU. Then the flowchart 202 moves to operation 204 as described in FIG. 2.

Figure 4:
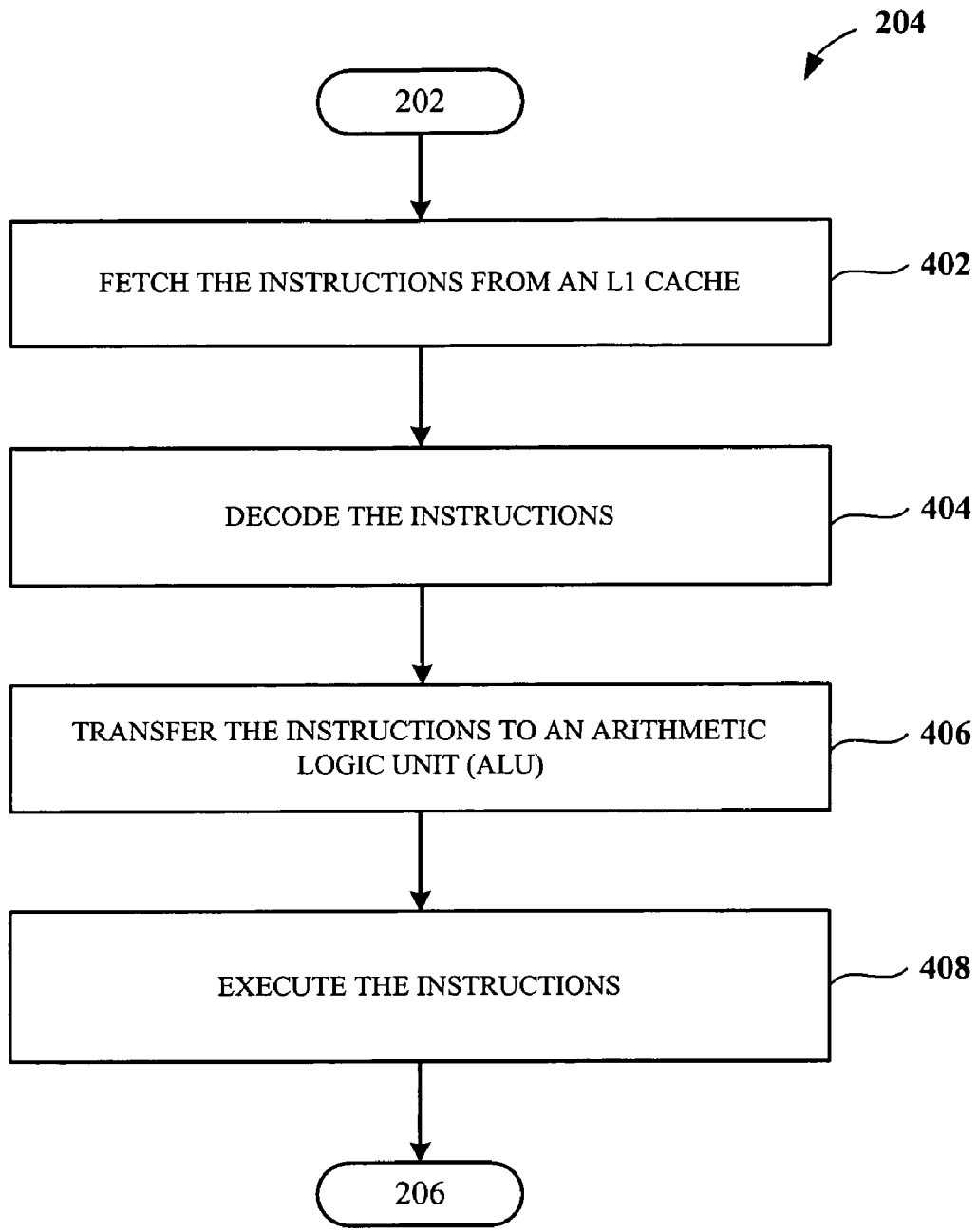
FIG. 4 shows a flowchart defining the loading and executing of instructions in accordance with one embodiment of the present invention.

FIG. 4 shows a flowchart 204 defining the loading and executing of instructions in accordance with one embodiment of the present invention. Flowchart 204 begins with operation 402 which fetches the instructions from an L1 cache. After operation 402, the flowchart 204 proceeds to operation 404 which decodes the instructions. Then operation 406 transfers the instructions to an arithmetic logic unit (ALU). After operation 406, the flowchart 204 advances to operation 408 which executes the instructions. Then the method advances to operation 206 as described in FIG. 2.

Figure 5:
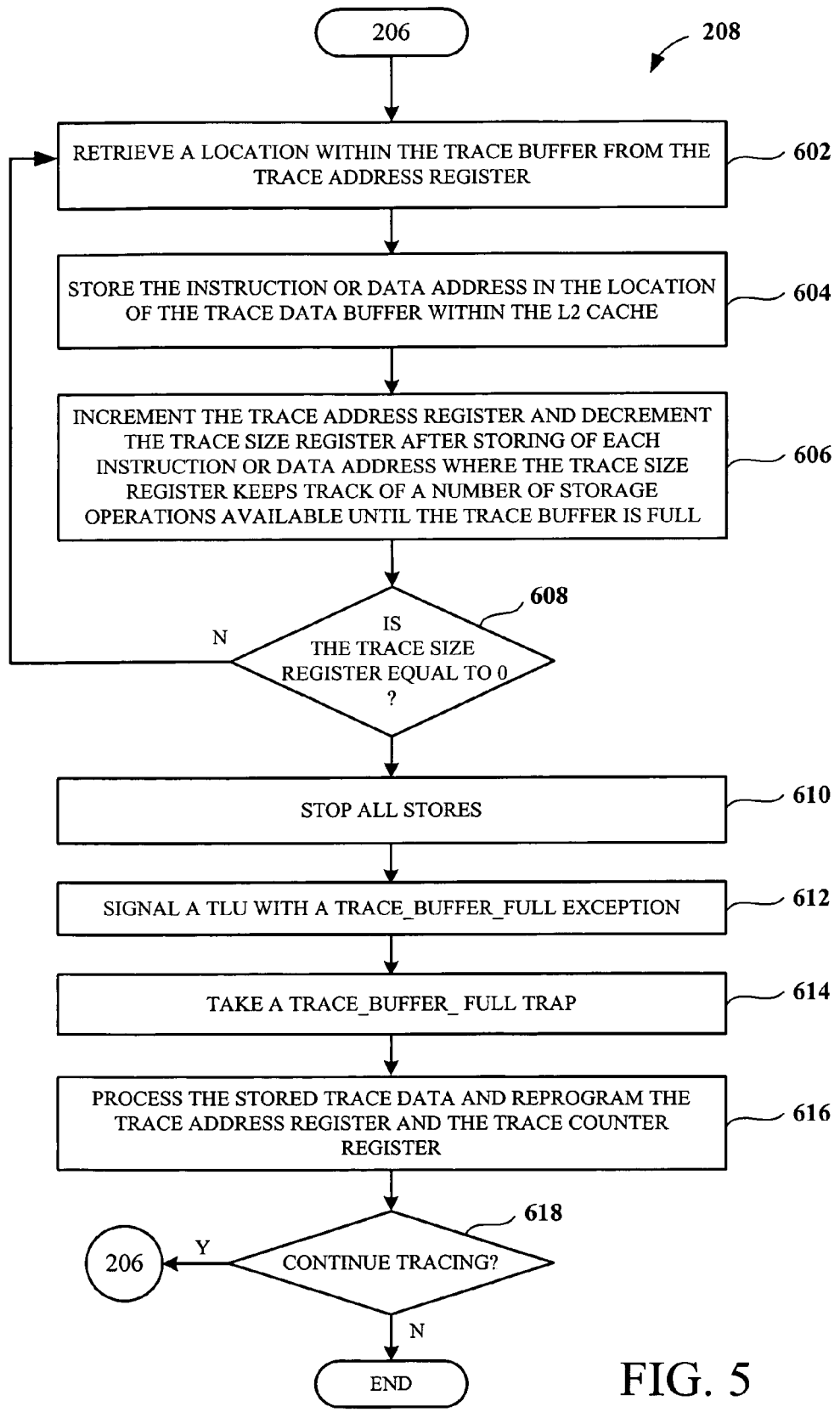
FIG. 5 shows a flowchart that defines the storing of instruction addresses generated from the trace into a trace buffer of a memory according to the trace register data and the processing of the stored instruction addresses in accordance with one embodiment of the present invention.

FIG. 5 shows a flowchart 208 that defines the storing of instruction addresses generated from the trace into a trace buffer of a memory according to the trace register data and processing of the stored instruction addresses in accordance with one embodiment of the present invention. The flowchart 208 begins with operation 602 which retrieves a location within a trace buffer from the trace address register. After operation 602, the flowchart 208 moves to operation 604 which stores the instruction or data address in the location of the trace data buffer within the L2 cache. It should be appreciated that instruction or data address may be stored in any suitable memory such as, for example, an L1 cache, main memory, an L2 cache, etc. Then the flowchart 208 advances to operation 606 which increments the trace address register and decrements the trace size register after storing each instruction address or data where the trace size register keeps track of a number of storage operations available until the trace buffer is full. After operation 606, the flowchart 208 proceeds to operation 608 which determines if the trace size register is equal to 0. If the trace size register is not equal to zero, the flowchart 208 returns to operation 602 and repeats operations 602, 604, 606, and 608. If the trace size register is equal to zero, the flowchart 208 advances to operation 610 which stops stores. After operation 610, the flowchart 208 proceeds to operation 612 which signals the TLU with a trace_buffer_full exception. In one embodiment, the MMU signals the TLU with such an exception. Then operation 614 takes a trace_buffer_full trap. After operation 614, the flowchart moves to operation 616 which processes the stored trace data and reprograms the trace address register and the trace counter register so that, in one embodiment, the trace can be restarted at the location where the tracing was stopped.

After operation 616 the flowchart 208 advances to operation 618 which determines whether the tracing continues. If the tracing continues, the flowchart 208 moves to operation 206 as described above in reference to FIG. 2. If there is no more tracing, the flowchart 208 ends.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for tracing of instructions executed by a processor, comprising:
    identifying a type of processor instruction to be traced by a particular thread separately from other types of processor instructions, the particular thread being assigned to particular trace registers within a memory management unit (MMU) of the processor, for each thread, the trace registers include trace configuration type register, a trace size register, and a trace address register;
    allocating a trace address allocation buffer in cache memory of the processor for each type of processor instruction;
    enabling parallel execution of multiple threads, for each thread, tracing at least one instruction corresponding to the type of processor instruction; and
    storing at least one address corresponding to the at least one instruction from the tracing into the cache memory of the processor, the storing continuing until the cache memory is full up to the size identified by the trace size register.

2. A method for tracing instructions executed by a processor as recited in claim 1, wherein storing at least one address corresponding to the at least one instruction from the tracing into a memory includes,
    incrementing an address in the trace buffer,
    decrementing a counter within the trace size register for each address of a traced instruction stored in the cache memory, and
    stopping the tracing when the counter is zero, defining an end to the tracing of the type of processor instruction.

3. A method for tracing instructions executed by a processor as recited in claim 1, wherein providing a type of processor instruction to be traced includes,
    providing the trace configuration register in the processor,
    providing the type of processor instruction to be traced,
    storing the type of processor instruction to be traced into the trace configuration register, and
    storing the type of address to be traced for the type of processor instruction in the trace configuration register.

4. A method for tracing of instructions executed by a processor as recited in claim 1, wherein tracing at least one processor instruction corresponding to the type of instruction includes,
    determining a type of at least one instruction that is executed,
    comparing the type of at least one instruction that is executed with the type of instruction stored in the trace configuration register.

5. A method for tracing of instructions executed by a processor as recited in claim 1, wherein tracing at least one instruction corresponding to the type of instruction includes, when the type of at least one instruction that is about to be run corresponds to the type of instruction stored in the trace configuration type register,
    tracing the at least one instruction, and
    determining addresses related to the tracing.

6. A method for tracing of instructions executed by a processor as recited in claim 3, wherein providing a type of instruction to be traced further includes,
providing the trace size register which is configured to include data showing a size of the trace buffer.

7. A method for tracing of instructions executed by a processor as recited in claim 3, wherein providing a type of instruction to be traced further includes,
providing the trace address register which is configured to include a starting address of the trace buffer.

8. A method for tracing of instructions executed by a processor as recited in claim 5, wherein storing the type of address to be traced for the type of instruction in the trace configuration register includes,
storing an instruction address or a data address of a traced instruction in the trace buffer within the cache memory, and
stopping the storing when the cache memory is full.

9. A method for tracing of instructions executed by a processor as recited in claim 2, wherein the counter corresponds to a number of addresses that can be stored within the cache memory.

10. A method for tracing of instructions executed by a processor, comprising:
storing a type of instruction to be traced by a particular thread separately from other types of processor instructions, the particular thread being assigned to particular trace registers within a memory management unit (MMU) of the processor, for each thread, the trace registers include a trace configuration type register, a trace size register, and a trace address register;
enabling parallel execution of multiple threads, for each thread, tracing at least one instruction corresponding to the type of processor instruction stored in the trace configuration type register within the memory management unit (MMU) of the processor; and
storing data from the tracing into a cache memory of the processor until the cache memory is full up to the size identified by the trace size register, the storing including decrementing a counter for each address stored in the cache memory and stopping the tracing when the counter is zero.

11. A method for tracing instructions executed by a processor as recited in claim 10, wherein providing a type of instruction to be traced includes,
providing the trace configuration register in the processor,
providing the type of processor instruction to be traced,
storing the type of processor instruction to be traced into the trace configuration register, and
storing the type of address to be traced for the type of instruction in the trace configuration type register.

12. A method for tracing of instructions executed by a processor as recited in claim 10, wherein tracing at least one instruction corresponding to the type of instruction stored in the processor includes,
determining a type of the at least one instruction that is executed,
comparing the type of at least one instruction that is executed with the type of instruction stored in the processor, and
when the type of at least one instruction that is executed corresponds to the type of instruction stored in the processor,
tracing at least one instruction, and
determining addresses related to the tracing.

13. A method for tracing of instructions executed by a processor as recited in claim 11, wherein providing a type of instruction to be traced further includes,
providing the trace size register which is configured to include data showing the size of a trace buffer.

14. A method for tracing of instructions executed by a processor as recited in claim 13, wherein providing a type of instruction to be traced further includes,
providing the trace address register which is configured to include a starting address of the trace buffer.

15. A method for tracing of instructions executed by a processor as recited in claim 13, wherein the trace configuration register supports sampling tracing based on one of numbers of instructions or numbers of cycles between samples.

16. A processor, comprising:
within the processor,
(a) a memory management unit (MMU) having a trace state machine, the trace state machine including trace registers defined by a trace configuration type register, a trace size register, and a trace address register, the MMU including a multiplexer and a hardware tablewalk;
(b) an arithmetic logic unit (ALU) configured to process instructions of multiple threads;
(c) a trap logic unit coupled to the ALU and the multiplexer of the MMU;
(d) a load/store unit (LSU) coupled to the ALU and the multiplexer of the MMU, the MMU configured to trace an instruction processed by the ALU by following output of the TLU and LSU for a particular thread separately from other types of processor instructions, each type of processor instruction being correlated with a set of the trace registers that include the trace configuration type register, the trace size register, and the trace address register, such that multiple threads execute in parallel with corresponding trace registers; and
(e) a cache memory holding one or more trace buffers, and each trace buffer being linked to an output of the multiplexer, and the hardware tablewalk providing translation between the MMU and the cache memory, and each trace buffer being correlated to particular trace registers that correspond to particular threads, such that the trace buffers have a size defined by the corresponding trace size register.

17. The processor of claim 16, further including,
an instruction fetch unit; and
a decode unit coupled to the instruction fetch unit, the decode unit providing decoding to the ALU.

18. The processor of claim 17, wherein the instruction fetch unit includes L1 cache.

19. The processor of claim 16, further including,
a translation storage buffer defined in the cache memory.

20. The processor of claim 16, wherein the cache memory is L2 cache.

* * * * *